United States Patent Office 3,439,494
Patented Apr. 22, 1969

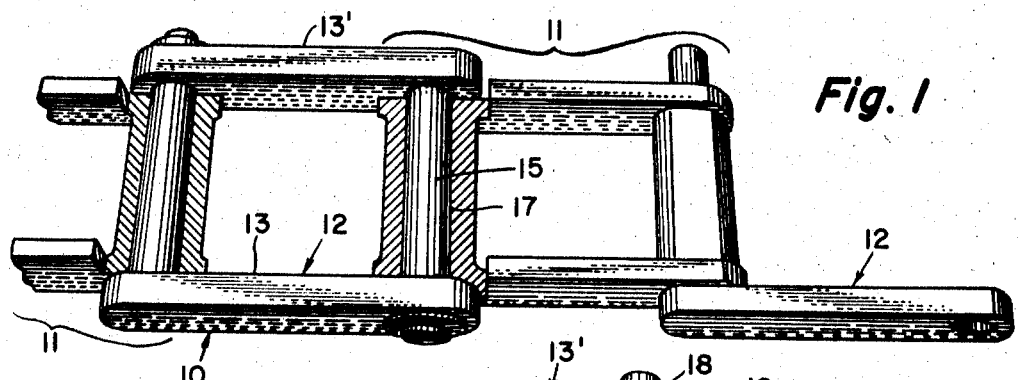
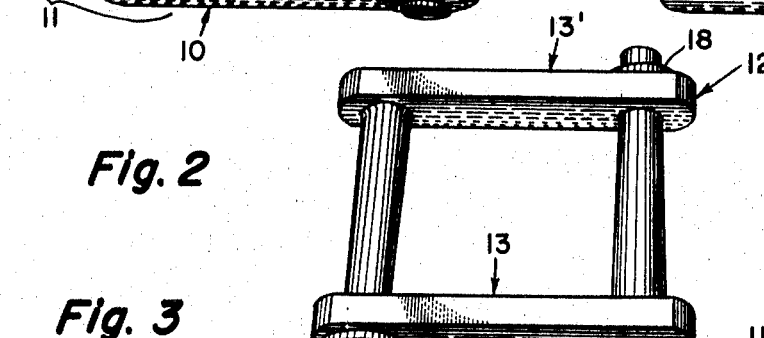
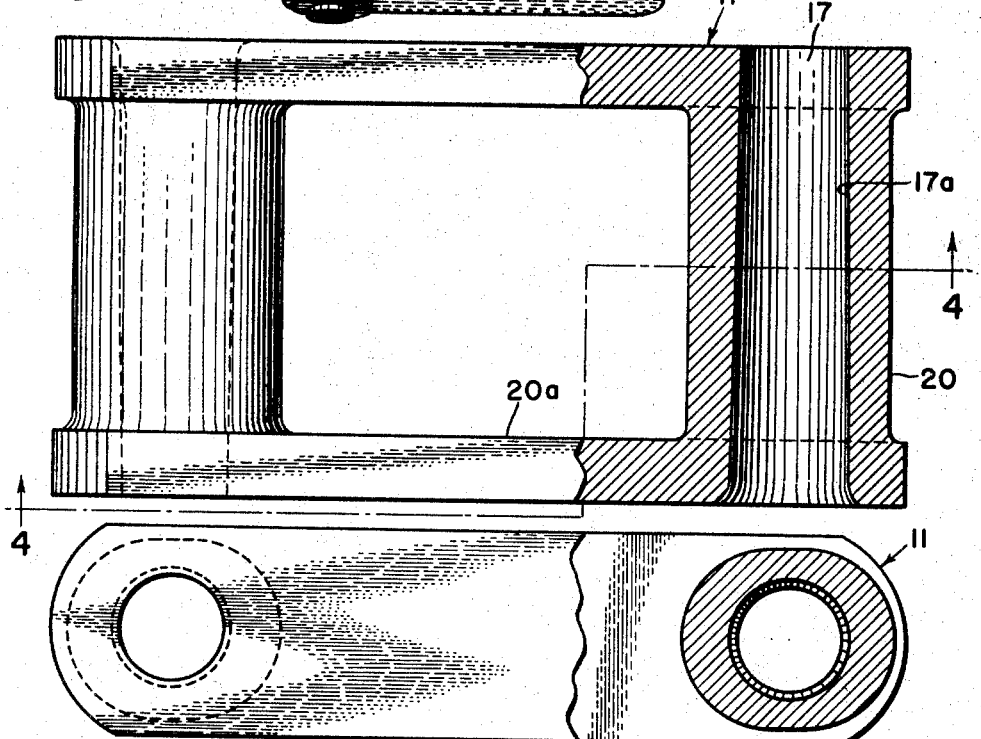

3,439,494
COMBINATION CHAIN
Richard W. Hutton and Philip L. Gettmann, Portland,
Oreg., assignors to Esco Corporation, Portland, Oreg.,
a corporation of Oregon
Filed Oct. 26, 1966, Ser. No. 589,582
Int. Cl. F16g 13/00, 13/08, 15/12
U.S. Cl. 59—78                                    2 Claims

ABSTRACT OF THE DISCLOSURE

A combination chain having a plurality of block links and a plurality of pintle links. Each block link includes a unitary body with tapered pintle bores, and having the tapers oppositely oriented with respect to each other. Each pintle link includes a pair of generally L-shaped members, each defined by a side bar and laterally-extending tapered pin which is receivable in a correspondingly tapered hole in the side bar of the other member. Each pin is also received in one of the tapered bores of an adjacent block link. The tapered pintle pins and tapered bores compensate for any tendency of the chain to follow an arcuate path.

---

This invention relates to a combination chain and, more particularly, to a combination chain made up of block links and pintle links. According to the invention, the links are shell-molded and the pins and openings tapered, the pins being integral with their associated plates employed to define the pintle links.

Through the practice of the invention, a novel and unique smoothness of fit, and therefore operation, is achieved in the pintle and block links of the combination chain and the provision of structure for achieving this constitutes an important object of the invention.

Other objects and advantages of the invention may be seen in the details of construction and operation as set down in this specification.

The invention is explained in conjunction with an illustrative embodiment in the accompanying drawing, in which—

FIG. 1 is a fragmentary perspective view, partially in section, of a length of chain featuring the teachings of the invention;

FIG. 2 is a perspective view of a pintle link embodying the inventive teaching;

FIG. 3 is an enlarged elevational view, partially in section, of a block link following the teachings of the invention;

FIG. 4 is an elevational view partially in section of the block link of FIG. 3 and which is taken along the sight line 4-4 as applied to FIG. 3;

Figure 5:
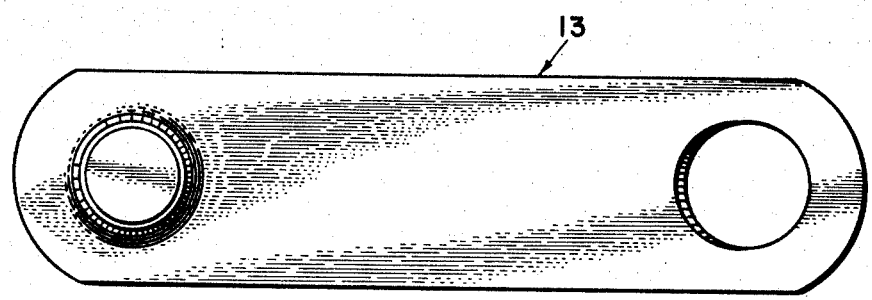
FIG. 5 is a side elevational view of a portion of a pintle link constructed according to the invention.

In the illustration given, and with particular reference to FIG. 1, a chain generally designated 10, is seen to include block links generally designated 11 and pintle links generally designated 12. A pintle link 12 is seen in isolated condition in FIG. 2 while a block link 11 is seen in isolated condition in FIGS. 3 and 4.

Figure 6:
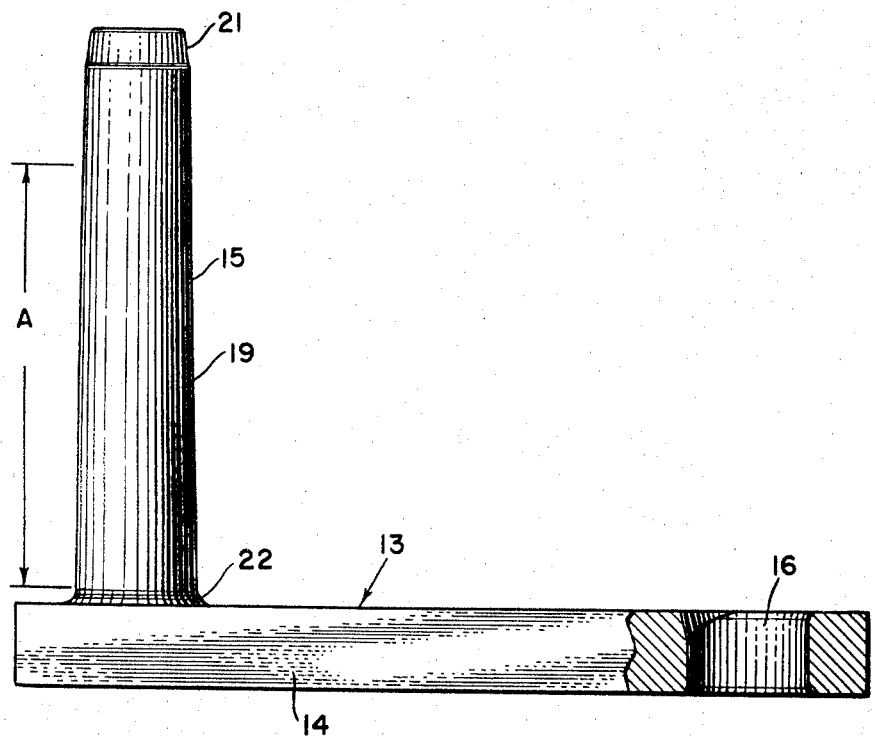
FIG. 6 is an elevational view, partially broken away of the pintle portion seen in FIG. 5.

In the practice of the invention, each pintle link 12 is made up of a pair of identical pintle portions generally designated 13 such as is seen in FIGS. 5 and 6. Each pintle portion 13 includes a side plate 14 and, integral therewith, a transversely, extending pin 15. As can be appreciated from a consideration of FIG. 2, the two portions 13 and 13' are joined together to form a generally rectangular configuration, each plate 14 having a through bore 16 for the receipt of the pin of the mating pintle portion 13.

Briefly, in assembling chain according to the invention, the block links are laid down as at 11 in FIG. 1. Thereafter, the two pintle portions 13 and 13' of the pintle link 12 are arranged between adjacent block links 11 and with the pin portion 15 positioned in the through-bores 17 provided as part of each block link. Each block link is a unitary body having tubular portions 20 integral with plate-like side portions 20a. Thereafter, the pintle portions 13 are interconnected and one advantageous way of achieving this is to make use of metal washers 18 which can be weldably secured to both the side plates 14 and the pins 15. Alternatively, the pin portion end may be deformed as by swaging to interlock the mating portions.

Also, according to the invention, we provide the pins 15 with a taper which can be seen best in FIG. 6 as at 19. In links 11 as at 17a (seen best at the righthand side of FIG. 3). Still further, we taper the through bores 16, again with the same degree of taper as the pins 15 and bores 17. It will be noted that the bores 17 in the block link 11 have reverse tapers—so that in assembly the pin of one L-shape side bar is inserted from one side of the block link while the pin from the other L-shaped side bar is inserted from the other side. This compensates for any tendency of the chain to follow an arcuate path. The tendency of a chain to follow an arcuate path results in accelerated wear and in some instances to jump off the drive sprockets because of its tendency to "ride" on one side. Further, we find the assembly facilitated by providing an additional taper at the very extreme of the pins 15 as at 21 (see FIG. 6). By virtue of employing a tapered pin, it is now possible to have the same section in the side bar where it engages the pin as is the case with straight pins, but by virtue of the taper we provide additional metal, hence strengthen, at other portions of the pin.

On the average we increase the bearing area by about 9%—this being of significance since the wear is thus distributed over a larger area.

Within the practice of the invention, the parts 11 and 13 are produced by shell-molding, utilizing a taper or draft of about ½° per side. The taper may vary somewhat according to casting practice from about ¼° to about 3°. Shell molding includes the use of hot-metal patterns plus a molding material of a sand and a thermosetting resin. Through the use of shell-molding, it is possible to obtain a smoothness and tolerance which provides an advantageous fit between the pintle and block portions of the chain.

In the practice of the invention, we provide a slight interference between the pin 15 and the through bore 16, i.e., of the order of about 0.015 inch so as to develop a strong, well-integrated pintle link 11. By this connection, we eliminate any tendency of the pin to wobble as was characteristic of the prior art resulting in accelerated wear in earlier constructions. On the other hand, there is about 0.034 inch clearance between the pin 15 and the through bore 17 of the associated block link. Optionally, the clearance is in the range of about 0.010 inch to about 0.100 inch. Desirably the clearance is maintained to the low half of this range to increase bearing area between the mating parts.

While in the foregoing specification a detailed description of an embodiment of the invention has been set down for the purpose of illustration, many variations in the details hereingiven may be made by those skilled in the art without departing from the spirit and scope of the invention.

We claim:

1. For a combination chain, a block link comprising a unitary body having a pair of tubular portions integral with plate-like side portions all arranged to provide a generally rectangular central opening for the receipt of a sprocket tooth, each tubular portion having a tapered through-bore with the tapers in the two through-bores being oppositely oriented whereby the bores are adapted to receive correspondingly tapered pintle pin portions and compensate for any tendency of the chain to follow an arcuate path.

2. A combination chain comprising a plurality of block links and a plurality pintle links in alternate, sequentially connected relation, each block link including a unitary body having a pair of tubular portions integral with plate-like side portions arranged to provide a central generally rectangular opening, each tubular portion having a tapered through-bore with the tapers being reversely oriented, each pintle link including a pair of pintle portions having a general L-shape defined by a side bar and integral laterally-extending pin, each pin being tapered and being received within a correspondingly tapered hole in the side bar of the other pintle portion side bar, said pins being tapered and being received in said through bores and means fixing each pin relative to its associated side bar hole.

References Cited
UNITED STATES PATENTS

| | | | |
|---|---|---|---|
| 1,448,663 | 3/1923 | Hoya | 59—78 |
| 2,447,921 | 8/1948 | Thomas | 59—86 |
| 3,155,225 | 11/1964 | Krekeler | 74—250 |

RICHARD J. HERBST, *Primary Examiner.*

G. P. CROSBY, *Assistant Examiner.*

U.S. Cl. X.R.

59—82, 85; 74—250